United States Patent
Morimoto et al.

US006855755B1

(10) Patent No.: US 6,855,755 B1
(45) Date of Patent: Feb. 15, 2005

(54) POLYAMIDE RESIN COMPOSITION HAVING IMPROVED WEATHERING RESISTANCE AND ITS MOLDED PRODUCTS

(75) Inventors: Kei Morimoto, Hiratsuka (JP); Noriyoshi Watanabe, Hiratsuka (JP); Hiroshi Urabe, Hiratsuka (JP); Masaki Hirono, Hiratsuka (JP); Kazuo Yamamiya, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 75 days.

(21) Appl. No.: 09/630,998

(22) Filed: Aug. 2, 2000

(30) Foreign Application Priority Data

| Aug. 4, 1999 | (JP) | ............................................ | 11-220989 |
| Aug. 4, 1999 | (JP) | ............................................ | 11-220990 |
| Aug. 4, 1999 | (JP) | ............................................ | 11-220991 |
| Aug. 4, 1999 | (JP) | ............................................ | 11-220992 |

(51) Int. Cl.$^7$ ............................................... C08L 77/00
(52) U.S. Cl. ...................... 524/106; 524/105; 524/186; 524/413; 524/451; 524/449; 524/538; 525/432
(58) Field of Search ........................ 525/432; 524/105, 524/106, 186, 413, 451, 449, 538

(56) References Cited

FOREIGN PATENT DOCUMENTS

| EP | 0 424 556 A1 | 5/1991 |
| EP | 0 441 623 A1 | 8/1991 |
| EP | 0 458 470 A1 | 11/1991 |
| EP | 0 580 387 A1 | 1/1994 |
| EP | 0585056 | * 3/1994 |
| EP | 0 620 244 A1 | 10/1994 |
| EP | 0 839 862 A1 | 5/1998 |
| JP | 43-6238 | 3/1943 |
| JP | 46-11591 | 3/1971 |
| JP | 47-6507 | 2/1972 |
| JP | 47-9750 | 3/1972 |
| JP | 47-13540 | 4/1972 |
| JP | 48-7699 | 3/1973 |
| JP | 62-29460 | 6/1987 |
| JP | 8-259809 | 10/1996 |

OTHER PUBLICATIONS

Abstract of XP 002150755.
Abstract of XP 002150761.

* cited by examiner

*Primary Examiner*—Ana L. Woodward
(74) *Attorney, Agent, or Firm*—David G. Conlin; John B. Alexander; Edwards & Angell, LLP

(57) ABSTRACT

The present invention relates to a polyamide resin composition comprising:

100 parts by weight of a polyamide resin mixture comprising
(A) 20 to 90% by weight of a polyamide 6 resin, a polyamide 66 resin or mixture thereof and
(B) 10 to 80% by weight of an aromatic polyamide resin; and
(C) 0 to 300 parts by weight of an inorganic filler,
said aromatic polyamide resin being having diamine units comprising 10 to 50 mol % of paraxylylenediamine units and 50 to 90 mol % of methaxylylenediamine units, and aliphatic dicarboxylic acid units.

25 Claims, No Drawings

POLYAMIDE RESIN COMPOSITION HAVING IMPROVED WEATHERING RESISTANCE AND ITS MOLDED PRODUCTS

BACKGROUND OF THE INVENTION

The present invention relates to a polyamide resin composition having improved weathering resistance. More particularly, it relates to a polyamide resin composition having improved weathering resistance which has high strength and modulus of elasticity and is capable of retaining gloss and minimized in surface roughening even if left in an outdoor exposure environment, and which is therefore best suited for manufacturing external trim parts of automobiles and railroad vehicles, parts of building materials and housing equipment, and the like. The present invention also relates to the molded articles using such a polyamide resin composition.

Since polyamide resins have excellent mechanical properties, moldability, chemical resistance and electrical properties, polyamide resins are popularly used for manufacturing automobile parts, machine parts, parts of electrical and electronic devices, parts relating to building materials and housing equipment, etc. Especially polyamide 6 is excellent in surpassing toughness and chemical resistance and used as an extrusion or injection molding material for monofilaments, films, sheets, etc., for manufacturing a variety of industrial articles.

Many attempts have been made for the improvement of heat resistance and mechanical properties of polyamide resins by incorporation of inorganic fillers, typically glass fiber, to realize weight reduction of the molded products by supersession of metal materials, yielding a remarkable economical effect. However, the extent of improvement of modulus of elasticity that can be achieved by the addition of inorganic fillers has a limitation. Also, there takes place a sharp reduction of modulus of elasticity in the temperature region exceeding the glass transition point of the inorganic fillers, which puts great restrictions on design flexibility in substitution of metal with plastic materials.

Various proposals have been made concerning metal substitution with resin materials. For example, Japanese Patent Application Laid-Open (KOKAI) Nos. 63-101420 and 63-105057 proposed polyamide resins comprising terephthalic acid and/or isophthalic acid and hexamethylenediamine, and Japanese Patent Application Laid-Open (KOKAI) No. 50-61449, etc., disclosed polyamide resins comprising adipic acid and methaxylylenediamine. These polyamide resins, however, are high in glass transition point, so that it is very difficult to obtain a molded article having excellent thermal properties and visual appearance, especially surface gloss, unless the mold temperature is set at a high level, not lower than 120° C. in injection molding.

Further, polyamide resins are very susceptible to oxidative degradation, and tend to incur undesirable phenomena such as lowering of mechanical strength, surface cracking, tinting, etc., with reduction of the degree of polymerization. It is notable that such oxidative degradation is accelerated by the external factors such as heat and light, so that use of the molded products of these polyamide resins in outdoor exposure environment is restricted.

Japanese Patent Application Laid-Open (KOKAI) No. 48-93652 and Japanese Patent Publication (KOKOKU) No. 63-29823 proposed to add various types of stabilizer in polyamide resin for preventing the said degradation phenomena. A typical means therefor, i.e. addition of an amine compound or a phenolic compound as an organic stabilizer in polyamide resin, is disclosed in Japanese Patent Publication (KOKOKU) Nos. 37-8183, 38-24725 and 36-2187.

However, the weathering resistance improving effect of these proposals is still unsatisfactory, and further improvement has been desired.

Japanese Patent Application Laid-Open (KOKAI) No. 8-259809 proposed a polyamide resin composition comprising an aromatic polyamide copolymer and an inorganic filler, which is excellent in moldability. However, There is no teaching for weathering resistance of the molded article therefrom. Further, there is a teaching that by blending polyamide 66 resin into the polyamide resin composition, the mechanical strength thereof is deteriorated because the water absorption become large. Therefore, in the above KOKAI, polyamide 66 resin is not blended into the polyamide resin composition from the above reason.

As a result of the present inventors' earnest studies to solve the above problems, it has been found that these problems can be eliminated by incorporating a specific aromatic polyamide resin into polyamide 6 and/or polyamide 66 resin.

The present invention has been attained on the basis of the above finding.

SUMMARY OF THE INVENTION

An object of the present invention is to provide a polyamide resin composition having excellent bending modulus of elasticity and heat resistance, high in degree of crystallization even at a relatively low mold temperature, and capable of providing the molded products with fine visual appearance.

Another object of the present invention is to provide a polyamide resin composition having excellent weathering resistance which has excellent thermal and mechanical properties and surface appearance, and particularly is capable of maintaining gloss with minimized surface roughening and change of color tone even if left in an outdoor exposure environment, and the molded products of such a resin composition.

To attain the above aim, in the first aspect of the present invention, there is provided a polyamide resin composition comprising:

100 parts by weight of a polyamide resin mixture comprising
(A) 20 to 90% by weight of a polyamide 6 resin, a polyamide 66 resin or mixture thereof and
(B) 10 to 80% by weight of an aromatic polyamide resin; and
(C) 0 to 300 parts by weight of an inorganic filler,
said aromatic polyamide resin having diamine units comprising 10 to 50 mol % of paraxylylenediamine units and 50 to 90 mol % of methaxylylenediamine units, and aliphatic dicarboxylic acid units.

In the second aspect of the present invention, there is provided a polyamide resin composition according to the first aspect wherein the amount of the inorganic filler (C) blended is 45 to 150 parts by weight based on 100 parts by weight of the polyamide resins (A) and (B).

In the third aspect of the present invention, there is provided a polyamide resin composition according to the first aspect wherein the amount of the inorganic filler (C) blended is less than 45 parts by weight based on 100 parts by weight of the polyamide resins (A) and (B).

In the fourth aspect of the present invention, there is provided a polyamide resin composition according to the first aspect, further comprising (D) 0.05 to 5 parts by weight of a light stabilizer based on 100 parts by weight of the polyamide resins (A) and (B).

In the fifth aspect of the present invention, there is provided a polyamide resin composition according to the first aspect, further comprising (E) 0.05 to 5 parts by weight of a phenolic antioxidant based on 100 parts by weight of the polyamide resins (A) and (B).

In the sixth aspect of the present invention, there is provided a polyamide resin composition according to the first aspect, further comprising (F) 0.01 to 5 parts by weight of a copper compound, a halide or mixture thereof based on 100 parts by weight of the polyamide resins (A) and (B).

In the seventh aspect of the present invention, there is provided a polyamide resin composition comprising:

100 parts by weight of a polyamide resin mixture comprising
(A) 20 to 90% by weight of a polyamide 6 resin, a polyamide 66 resin or mixture thereof and
(B) 10 to 80% by weight of an aromatic polyamide resin; and
(C) 0 to 300 parts by weight of an inorganic filler, said aromatic polyamide resin mainly comprising a polyamide obtained from polycondensation reaction of a diamine mixture comprising 10 to 50 mol % of paraxylylenediamine and 50 to 90 mol % of methaxylylenediamine, and an aliphatic dicarboxylic acid.

In the eighth aspect of the present invention, there is provided a molded article for outdoor use, obtained by molding a polyamide resin composition as defined in the first aspect.

DETAILED DESCRIPTION OF THE INVENTION

The present invention is described in detail below.

In the present invention, it is essential to use a polyamide 6 resin and/or a polyamide 66 resin as component (A). Polyamide 6 resin used in the present invention mainly comprises ε-caprolactam (hereinafter abbreviated as CL) or ε-aminocaproic acid, in which caprolactam units constitute not less than 90 mol % of the whole structural units. This polyamide 6 resin may contain the units comprising other co-monomers than the caprolactam units, for example ω-laurolactam unit. Also usable as component (A) is polyamide 66 resin which mainly comprises equimolar salts of hexamethylenediamine and adipic acid (hereinafter referred to as AH salts). It is further possible to use 6/66 copolymer polyamides mainly comprising the said AH salts and CL or ε-aminocapronic acid, or a blend of these polyamide resins.

Relative viscosity of polyamide 6 resin and polyamide 66 resin used as component (A) in the present invention preferably falls within the range of 1.8 to 3.5 as measured in a 98% sulfuric acid solution in a concentration of 1 g/100 ml at 25° C. If the relative viscosity thereof is too low, the resin composition may have poor mechanical strength. If the relative viscosity thereof is too high, the moldability of the composition may be deteriorated. More preferred range of relative viscosity of the said component (A) resins is 2.0 to 3.2, especially preferably 2.1 to 3.0.

As the component (B) of the composition of the present invention, there is used an aromatic polyamide resin having a diamine unit comprising 10 to 50 mol % of paraxylylenediamine unit and 50 to 90 mol % of methaxylylenediamine unit, and an aliphatic dicarboxylic acid.

If the percentage of paraxylylenediamine unit in the said diamine unit is less than 10 mol %, the polyamide resin proves to be low in crystallization rate, which tends to cause deterioration of moldability, deformation of the molded article due to insufficient crystallization and a reduction of mechanical strength. On the other hand, if the percentage of paraxylylenediamine unit exceeds 50 mol %, the melting point of the polyamide resin elevates excessively, which tends to cause heat deterioration of the composition on heating in the molding operation, making it difficult to carry out desired molding. In the present invention, it is more preferable to use a diamine unit comprising 20 to 45 mol % of paraxylylenediamine unit and 55 to 80 mol % of methaxylylenediamine unit, even more preferably a diamine unit comprising 20 to 40 mol % of paraxylylenediamine unit and 60 to 80 mol % of methaxylylenediamine unit.

The said diamine unit may comprise, beside paraxylylenediamine unit and methaxylylenediamine unit, an aliphatic diamine unit, an aromatic diamine unit and an alicyclic diamine unit. The percentage of the diamine unit other than paraxylylenediamine unit and methaxylylenediamine unit is preferably not more than 10 mol %, even more preferably not more than 5 mol % of the total amount of diamine unit.

Aliphatic diamine unit usable in the present invention include tetramethylenediamine unit, pentamethylenediamine unit, hexamethylenediamine unit, octamethylenediamine unit and nonamethylenediamine unit, aromatic diamine unit include methaphenylenediamine unit and paraphenylenediamine unit, and alicyclic diamine unit include 1,3-bisaminomethylcyclohexane unit and 1,4-bisaminomethylcyclohexane unit.

Aliphatic dicarboxylic acids used for the preparation of aromatic polyamide resins are preferably $\alpha,\delta$-straight-chain dicarboxylic acids. The carbon number of these aliphatic dicarboxylic acids is preferably 6 to 12. Examples of such aliphatic dicarboxylic acids include adipic acid, succinic acid, glutaric acid, pimelic acid, suberic acid, azelaic acid, sebacic acid, undecanoic diacid and dodecanoic diacid.

The aromatic polyamide resin used in the present invention may contain a small quantity of aromatic dicarboxylic acid beside the said aliphatic dicarboxylic acids. A typical example of such aromatic dicarboxylic acid is 1,5-naphthalenedicarboxylic acid. In case where an aromatic dicarboxylic acid is used, its percentage is preferably not more than 10 mol %, more preferably not more than 5 mol % of the total amount of the dicarboxylic acids.

Relative viscosity of the aromatic polyamide resin (B) preferably falls within the range of 1.6 to 3.0, more preferably 1.7 to 2.9, most preferably 1.8 to 2.8, as measured in a 96% sulfuric acid solution in a concentration of 1 g/100 ml at 25° C. If relative viscosity of the said resin (B) is too low, the produced composition may be unsatisfactory in mechanical strength, and if relative viscosity is too high, moldability of the composition may be deteriorated.

The polyamide resin mixture used in the present invention comprises (A) a polyamide 6 resin and/or a polyamide 66 resin and (B) an aromatic polyamide resin, the ratio of (A)/(B) being 20–90/10–80 in percent by weight (the total being 100 parts by weight). If the ratio of the polyamide 6 resin and/or polyamide 66 resin is less than 20% by weight, the obtained polyamide resin composition tends to suffer a substantial discoloration in the exposure test, making it unable to obtain a good visual appearance of the molded product. If the above ratio exceeds 90% by weight, both modulus of elasticity and strength of the composition may be reduced (especially at high temperatures). The (A)/(B) ratio is preferably in the range of 25–85%/75–15% by weight, more preferably 25–75%/75–25% by weight.

As the polyamide 6 resin and/or polyamide 66 resin (A) and the aromatic polyamide resin (B), it is possible to use those which differ in melt viscosity from each other so that certain distinction would be given to the properties of the obtained polyamide resin composition. Melt viscosity of the polyamide 6 resin and/or polyamide 66 resin (A) and of the aromatic polyamide resin (B) can be measured by using an ordinary capillary tube viscometer. It is notable that in the surface of a molded product obtained by using a polyamide resin composition in which melt viscosity of (A) is lower than that of (B), there tends to exist a greater amount of (A) than (B), and the obtained molded product excels especially in impact resistance and resistance to discoloration under outdoor exposure. In case of using a polyamide resin composition in which melt viscosity of (A) is higher than that of (B), the obtained molded product is distinguished by its retention of modulus of elasticity at high temperatures, its surface weatherability and its light resistance of the surface under outdoor exposure condition. For affording such specificity to the polyamide resin composition, there is used a proper combination of (A) and (B) selected such that the ratio of higher to lower melt viscosity would be preferably not less than 1.5, more preferably not less than 2.0, under the condition of same temperature and same shear rate.

Known inorganic fillers can be used as inorganic filler (C). The form of the inorganic filler used is not defined; it may be, for instance, fibrous, plate, needle-like, spherical, powdery, granular or flaky. The inorganic fillers usable as component (C) include, for example, glass fiber, carbon fiber, talc, mica, glass flake, wollastonite, potassium titanate whisker, magnesium sulfate, sepiolite, xonolite, aluminum borate whisker, glass bead, balloon, calcium carbonate, silica, kaolin, clay, titanium oxide, barium sulfate, zinc oxide, magnesium hydroxide and the like. These inorganic fillers may be used either singly or as a mixture of two or more.

Examples of fibrous fillers include glass fiber, whiskers of potassium titanate or calcium sulfate, carbon fiber, alumina fiber, and fibrous wollastonite. The average fiber diameter of the fibrous filler used in this invention is preferably not more than 14 $\mu$m for obtaining good visual appearance. The average fiber length of the fibrous filler is preferably not more than 500 $\mu$m, more preferably not more than 200 $\mu$m in the molded product. The average fiber diameter and average fiber length of the fibrous filler were determined by microscopy.

Examples of powdery, granular or flaky inorganic fillers include kaolinite, silica, mica, talc, clay, glass flake, glass bead, potassium titanate, wollastonite, carbonates such as calcium carbonate and magnesium carbonate, sulfates such as calcium sulfate and magnesium sulfate, sulfides, and metal oxides. In the resin composition of the present invention is preferably blended talc powder for expediting crystallization of the polyamide resin. The average particle diameter of the powdery, granular or flaky inorganic filler is preferably not more than 50 $\mu$m. If the average particle diameter of the filler is more than 50 $\mu$m, the visual appearance of the product may be deteriorated. The average particle diameter of the powdery, granular or flaky inorganic filler, which was determined by microscopy, is more preferably not more than 40 $\mu$m.

The preferred examples of inorganic filler for use in the present invention are glass fiber, talc and mica. In the present invention, such an inorganic filler is blended in an amount of 0 to 300 parts by weight based on the sum of the polyamide resins (A) and (B). If the amount of inorganic filler exceeds 300 parts by weight, the processability of the composition may be deteriorated. In case where the amount of the inorganic filler is 45 to 300 parts by weight, it is preferable to blend at least one of the substances (D), (E) and (F) described later as additional component. The amount of the inorganic filler blended is preferably within the range of 45 to 200 parts by weight, more preferably 45 to 180 parts by weight, even more preferably 50 to 150 parts by weight. If the amount of the inorganic filler blended is too small, modulus of elasticity of the composition may be lowered. If the amount of the inorganic filler blended is too large, the moldability of the composition may be deteriorated and it may be difficult to obtain good visual appearance of the molded product.

Especially, the polyamide resin composition according to the present invention comprises polyamide resin mixture comprising a polyamide 6 and/or polyamide 66 and an aromatic polyamide resin using the specific diamine mixture, and is excellent in weathering resistance and light resistance under indoor or outdoor environment affected by sunshine strongly. In order to afford high mechanical strength such as high impact resistance and elasticity thereto, the inorganic filler may be blended thereinto. In case of using the polyamide resin composition which is required high glossiness of the surface of the molded article therefrom and reduction of surface roughening, it is preferable that the inorganic filler is blended in an amount of less than 45 parts by weight based on 100 parts by weight of a polyamide resin mixture, or blended in the amount of 45 to 300 parts by weight and together at least one of the substances (D) light stabilizer, (E) phenolic antioxidant and (F) a copper compound and/or a halide is blended.

A light stabilizer may be used as an additional component (D) of the composition of the present invention. It is possible to use the known light stabilizers, for example, hindered amine-based ultraviolet absorbers having a 2,2,6,6-tetramethylpiperidine skeleton, benzotriazole-based ultraviolet absorbers, benzophenone-based ultraviolet absorbers or benzoate-based ultraviolet absorbers and quenchers such as organic nickel compounds. These light stabilizers may be used either singly or as a mixture of two or more. Hindered amine-based ultraviolet absorbers and benzotriazole-based ultraviolet absorbers are preferred in the present invention.

In the present invention, light stabilizer (D) is added in an amount of 0.05 to 5 parts by weight, preferably 0.1 to 3 parts by weight, more preferably 0.2 to 2 parts by weight, based on 100 parts by weight of the polyamide resins (A) and (B). If the content of light stabilizer is less than 0.05 part by weight, the weathering resistance may not be improved sufficiently. If the amount of light stabilizer is more than 5 parts by weight, the mechanical properties of the composition may be deteriorated. Steam pressure of the light stabilizer (D) at 25° C. is preferably not more than $10^{-5}$ Pa. If its steam pressure is higher than $10^{-5}$ Pa, the component (D) tends to become volatile during processing to cause deterioration of processability of the composition or a decrease of concentration of light stabilizer in the molded product to deteriorate its weathering resistance.

A phenolic antioxidant can be used as still another component (E) of the composition of the present invention. Examples of the phenolic antioxidants usable in the present invention include hindered phenols, for example, 3,9-bis{2-[3-(3-t-butyl-4-hydroxy-5-methylphenyl)propionyloxy]-1,1-dimethylethyl}-2,4,8,10-tetraoxaspyro[5,5]undecane, pentaerythrityl-tetraquis[3-(3,5-di-t-butyl-4-hydroxyphenyl)propionate], N,N'-hexamethylenebis(3,5-di-t-butyl-4-hydroxy-hydrosinamamide), and 3,5-di-t-butyl-4-hydroxy-benzylphosphonate-diethyl ester.

A phenolic antioxidant (E) is added in an amount of 0.05 to 5 parts by weight, preferably 0.1 to 3 parts by weight, more preferably 0.2 to 2 parts by weight, based on 100 parts by weight of the polyamide resins (A) and (B). If the amount of (E) is less than 0.05 part by weight, the weathering resistance may not be improved sufficiently. If the amount of (E) is more than 5 parts by weight, the mechanical properties of the composition may be deteriorated. Steam pressure of the phenolic antioxidant (E) at 25° C. is preferably not more than $10^{-6}$ Pa. If its steam pressure is more than $10^{-6}$ Pa, the phenolic antioxidant may become volatile during processing to deteriorate processability of the composition or weathering resistance of the molded product due to decreased concentration of (E).

In the present invention, a copper compound and/or a halide are further used as yet another component (F). They are used in a total amount of 0.01 to 5 parts by weight based on 100 parts by weight of the polyamide resins (A) and (B). As the copper compound (F'), it is possible to use copper salts, either cuprous or cupric, of various kinds of inorganic and organic acids, such as copper chloride, copper bromide, copper iodide, copper phosphate and copper stearate.

As the halide, it is possible to use both organic and inorganic halides, for example, halides of alkaline metals or alkaline earth metals, ammonium halide, halides of organic quaternary ammonium, alkyl halide, allyl halide, ammonium iodide, stearyltriethylammonium bromide, benzyltriethylammonium iodide and the like. It is preferred to use alkali metal halides (F") such as potassium chloride, sodium chloride, potassium bromide, potassium iodide and sodium iodide.

In the present invention, combined use of a copper compound and a halide such as mentioned above is preferred because it produces an even better effect in improving weathering resistance. A combination of a copper compound and an alkali metal halide is especially preferred. In case where a copper compound alone is used, the molded product may be tinted in reddish brown by dint of copper. Such tinting is not preferable depending on the use, but in some applications where the molded product is colored on purpose with a pigment or other means, said tinting may pose no problem.

In the present invention, a copper compound (F') such as mentioned above is added in an amount of 0.01 to 2 parts by weight, preferably 0.03 to 2 parts by weight, more preferably 0.05 to 1 part by weight, based on 100 parts by weight of the polyamide resins (A) and (B). If the amount of (F') is less than 0.01 part by weight, the weathering resistance may not be improved sufficiently. If the amount of (F') is more than 2 parts by weight, the mechanical properties may be deteriorated or undesirable tinting may increase.

A halide is added in an amount of 0.05 to 3 parts by weight, preferably 0.1 to 2 parts by weight, more preferably 0.1 to 1 part by weight, based on 100 parts by weight of the polyamide resins (A) and (B). If the halide content is less than 0.05 part by weight, the weathering resistance may not be improved sufficiently. If the halide content is more than 3 parts by weight, the mechanical properties of the composition may be deteriorated.

In the polyamide resin composition of the present invention, it is possible to properly blend, in addition to the above-said components, various types of additives generally used for the polymeric materials, such as antistatic agent, coloring material such as dye or pigment, release agent, lubricant, plasticizer, nucleating agent, and stabilizers against oxidation, heat and ultraviolet light.

The conventional methods can be used for producing the polyamide resin composition of the present invention. For instance, a method can be used in which the starting polyamide resins, which may be blended with the optional component materials such as inorganic filler, light stabilizer, phenolic antioxidant, a copper compound and/or a halide, etc., in any preferable order by a blender or other means, are melted and kneaded by a commonly used apparatus such as a vent type single- or double-screw extruder or other similar means.

The polyamide resin composition according to the present invention can provide a molded article having an excellent flexural modulus of elasticity. Especially, in case of using the polyamide resin composition which is required high mechanical strength such as high impact resistance and high modulus of elasticity, the flexural modulus of elasticity thereof is preferably not less than 10 GPa at room temperature and not less than 7 GPa at 80° C. Usually, this flexural modulus of elasticity can be attained by blending the inorganic filler in an amount of 45 to 300 parts by weight based on 100 parts by weight of polyamide resins (A) and (B). And also, the polyamide resin composition according to the present invention is capable of providing a molded article having an excellent surface gloss in which the glossiness of the surface of the molded article by a #3000 mirror-polished mold at an ordinary mold temperature (70–90° C.) is not less than 80%. Especially, in case of using the polyamide resin composition which is required high glossiness of the surface of the molded article therefrom and reduction of surface roughening, it is preferable to blend the inorganic filler in the amount of less than 45 parts by weight based on 100 parts by weight of a polyamide resin mixture, or to blend the inorganic filler in the amount of 45 to 300 parts by weight and at least one of the substances (D), (E) and (F) in the specific amount as described above.

The polyamide resin composition obtained from the said melting and kneading process can be molded into various articles by the known methods and such articles can be offered to various uses. Quality superiority of these articles is especially conspicuous in outdoor use, for instance when they are used as external trim parts for automobiles or railroad vehicles, such as fender, bumper, wheel cap, aeroparts, sideview mirror stay, roof rail, etc., inside parts for window, and parts relating to building materials and housing equipment. Especially, the molded articles made from the polyamide resin composition of the present invention is preferable used as parts or equipment using under the circumstance strongly influenced by sunshine in outdoor or indoor.

The polyamide resin composition of the present invention has excellent flexural modulus of elasticity with minimized drop of modulus of elasticity at high temperatures, also possesses high heat resistance, and is capable of providing the molded articles having excellent mechanical properties and surface gloss as well as a high degree of crystallinity and good visual appearance with ease at a relatively low mold temperature. These molded articles are therefore very useful as automobile parts, electrical and electronic parts, and other various kinds of industrial parts.

Further, the polyamide resin composition of the present invention, in addition to its excellent properties inherent in polyamides, is also featured by its retention of surface gloss with minimized surface roughening and change of color tone even if left in an outdoor exposure environment, so that the composition is very useful for applications where especially high weathering resistance is required, such as external trim parts of automobiles and railroad vehicles, and parts of building materials and housing equipment. The polyamide resin composition of the present invention is also notable for its good moldability and can be used advantageously for producing various types of molded articles.

EXAMPLES

The present invention is described in further detail with reference to the examples thereof, which examples are however merely intended to be illustrative and not to be construed as limiting the scope of the present invention.

The materials used in the following Examples and

Comparative Examples are Listed Below

<Polyamide Resins>

(1) Polyamide 6 resin X: NOVAMID 1008 (trade name) produced by Mitsubishi Engineering-Plastics Corporation; relative viscosity: 2.3.

(2) Aromatic polyamide resin: aromatic polyamide A obtained in Referential Example 1.
(3) Aromatic polyamide resin: aromatic polyamide B obtained in Referential Example 2.
(4) Polyamide 6 resin Y: NOVAMID 100 7J (trade name) produced by Mitsubishi Engineering-Plastics Corporation; relative viscosity: 2.2.
(5) Polyamide 66 resin: Amilan CM3001N (trade name) produced by Toray Corp.; relative viscosity: 2.95.
(6) Polyamide MXD6: produced by Mitsubishi Gas Chemical Co., Inc., prepared from methaxylylenediamine and adipic acid, relative viscosity: 2.14 (measured in 98% sulfuric acid solution at 25° C.).

<Inorganic Fillers>
(1) Talc A: Micron White 5000A (trade name) produced by Hayashi Kasei KK; average particle diameter: 4.1 $\mu$m.
(2) Talc B: TM-2 produced by Fuji Talc Co., Ltd.; average particle diameter: 5.0–6.0 $\mu$m.
(3) Inorganic filler: glass fiber P, ECS03T-296GH (trade name) produced by Nippon Denki Glass KK: average fiber diameter: 10 $\mu$m; average fiber length: 150 $\mu$m.
(4) Inorganic filler: glass fiber Q, 3 mm long chopped strand, CS03-JAFT2 (trade name) produced by Asahi Fiber Glass Co., Ltd.

<Other Additives>
(1) Hindered amine A: polycondensate of dimethyl succinate and 1-(2-hydroxyethyl)-4-hydroxy-2,2,6,6-tetramethylpiperidine, Tinuvin 622LD (trade name) produced by Nippon Ciba Geigy Corp.; steam pressure: $2.5 \times 10^{-5}$ Pa.
(2) Hindered amine B: Adegastab LA-52 (trade name) produced by Asahi Denka Kogyo KK.
(3) Benzotriazoles: 2-[2-hydroxy-3,5-bis ($\alpha,\alpha$-dimethylbenzyl)phenyl]-2H-benzotriazole, Tinuvin 234 (trade name) produced by Nippon Ciba Geigy Corp.; steam pressure: $2.0 \times 10^{-10}$ Pa.
(4) Phenolic antioxidant: 3,9-bis{2-[3-t-butyl-4-hydroxy-5-methylphenyl]propionyloxy]-1,1-dimethylethyl}-2,4,8,10-tetraoxaspiro[5,5]undecane, Adegastab AO-80 (trade name) produced by Asahi Denka Kogyo KK; steam pressure: $1.0 \times 10^{-12}$ Pa.
(5) Copper chloride, product by Nippon Kagaku Sangyo KK.
(6) Copper iodide, product by Nippon Kagaku Sangyo KK.
(7) Potassium iodide, product by Nippon Kagaku Sangyo KK.
(8) Carbon black, #44B, product by Mitsubishi Chemical Corporation.

Referential Example 1

Adipic acid was melted by heating in a reaction vessel under a nitrogen atmosphere. To the molten dicarboxylic acid, a xylylenediamine mixture consisting of 30 mol % of paraxylylenediamine and 70 mol % of methaxylylenediamine was added dropwise, and the solution was stirred while maintaining the reaction temperature so that it would always remain higher than the melting point of the product. After completion of the dropwise addition, stirring and reaction were continued until the prescribed viscosity was reached, at which point the reaction product was taken out of the reaction vessel, cooled with water and pelletized. The thus obtained aromatic polyamide A had a melting point of 258° C., a crystallization temperature of 206° C. and a relative viscosity (measured in a 96% sulfuric acid solution at a concentration of 1 g/100 ml) of 2.08.

Referential Example 2

Adipic acid was melted by heating in a reaction vessel under a nitrogen atmosphere. To the molten dicarboxylic acid, methaxylylenediamine and a xylylenediamine mixture consisting of 50 mol % of paraxylylenediamine and 50 mol % of methaxylylenediamine were added dropwise in two stages so that the mixed solution would finally consist of 40 mol % of paraxylylenediamine and 60 mol % of methaxylylenediamine, and the solution was stirred while maintaining the reaction temperature so that it would always remain higher than the melting point of the product. After completion of the dropwise addition, stirring and reaction were continued until the prescribed viscosity was reached, at which point the reaction product was discharged out of the reaction vessel, cooled with water and pelletized. The resulting aromatic polyamide B had a melting point of 269° C., a crystallization temperature of 227° C. and a relative viscosity (measured in a 96% sulfuric acid solution at a concentration of 1 g/100 ml) of 2.13.

In the Examples and Comparative Examples, determinations and evaluations were made according to the following methods.

(1) Crystallinity

Determined by the DSC method. The molded article to be tested, worked to a 1.6 mm thickness, was subjected to a differential scanning calorimeter (DSC), and the difference between the total of the melting peak areas and the non-crystallization peak area (low-temperature crystallization peak area) was divided by the theoretical crystal melting heat quantity, the obtained value being expressed in percentage.

(2) Bending Test (Flexural Modulus of Elasticity)

Conducted according to ASTM D790 (at 23° C. or 80° C.)

(3) Visual Appearance (Glossiness)

A disc of 100 mm in diameter and 3 mm in thickness was molded, and its glossiness was measured by a glossmeter.

(4) Moldability

A 100×150×50 mm box with a thickness of 2 mm was molded under the conditions of: resin temperature=275° C.; mold temperature=90° C.; injection pressure=500 kgf/cm$^2$; injection speed=50 mm/sec; dwelling pressure=300 kgf/cm$^2$; injection pressure dwelling time=12 sec; cooling time=20 sec, and releasability in the molding operation and visual appearance of the molded article (box) were evaluated into the following three-grade.

○: Releasability was good, and there was noted little surface roughening.

Δ: Releasability was rather bad, and surface roughening was observed.

X: Releasability was bad, and surface roughening was excessive.

(5) Accelerated Deterioration Test

A 70 mm×70 mm square mirror-surface or embossing texture plate with a thickness of 3 mm was molded under the conditions of: resin temperature=275° C.; mold temperature=90° C.; injection pressure=500 kgf/cm$^2$; injection speed=30 mm/sec; dwelling pressure=200 kgf/cm$^2$; injection pressure dwelling time=12 sec; cooling time=20 sec, and it was subjected to the following three accelerated deterioration tests. Weathering resistance was evaluated by the changes of glossiness and color difference after the test. The testing conditions and the methods of determination of glossiness and color difference are shown below.

1) Super UV Test

<Testing Conditions>

Tester: Eye super UV (trade name)

Test piece: square mirror-surface plate (molded by a #3000 mirror polished mold)

Light intensity: 50 mW/cm$^2$ (295–450 nm)

Humidity: not less than 90% in RH

Temperature: 63±3° C.

Test time: 200 or 300 hours

2) Metaling Weather Test

<Testing Conditions>

Test piece: square embossing texture plate (embossed by HN1009 produced by Nihon Etching Co., Ltd.)

1. Irradiation step: temperature: 63° C., Humidity: 70% in RH, Irradiance: 1.55 kW/m$^2$, Irradiation time: 4 hours
2. Darkness step: temperature: 70° C., Humidity: 90% in RH, Time: 4 hours
3. Dew condensation step: temperature: 30° C., Humidity: 95% in RH, Time: 4 hours The above 1–3 steps consists of one test cycle and this test cycle was continuously conducted for 900 hours.

3) Sunshine Fade Test

<Testing Conditions>

Test piece: square mirror-surface plate (molded by a #3000 mirror. polished mold)

Light intensity: 75 mW/cm$^2$

Temperature: 83±3° C.

Test time: 400 hours (Determination of Glossiness)

Glossiness was determined according to the method of JIS Z-8741 using a digital variable-angle glossmeter UGV-5K mfd. by Suga Testing Machines Co., Ltd. Measurement was made at an angle of 60 degrees. The greater the measured value, the closer is the molded article (plate) surface to the mirror-surface state.

(Determination of Color Difference)

Color difference was determined according to the reflection method of JIS Z-8722 using a multiple-light-source spectroscopic calorimeter MSC-5N-GV5 mfd, by Suga Testing Machines Co., Ltd. Optical system: d/8; light flux: φ15 mm. The smaller the measured value, the less is the color difference.

(6) Surface Observation Test (Surface Condition)

The square plate after the accelerated deterioration test obtained according to the method of (5) described above was observed under a stereo microscope, and the surface condition was evaluated into the following 4-grade.

◎: Almost no surface roughening was noted.

○: Slight surface roughening was observed.

Δ: Surface roughening was seen.

X: Excessive surface roughening was seen.

Example 1

A blend of 75 parts by weight of polyamide 6 resin X, 25 parts by weight of aromatic polyamide A, 100 parts by weight of glass fiber P and 2 parts by weight of talc A was melted and kneaded by a vent type single-screw extruder (mfd. by Nakatani Machinery Co., Ltd.) at a cylinder temperature of 280° C., then cooled with water and pelletized. The obtained pellets of the resin composition were injection molded into a 13 mm wide, 100 mm long and 1.6 mm thick test piece for measuring crystallinity, a test piece for the bending test and a 100 mm disc test piece for evaluation of visual appearance. Evaluation results are shown in Table 1.

Example 2

The same procedure as defined in Example 1 was conducted except that the amount of polyamide 6 resin X and aromatic polyamide A were changed to 60 parts by weight and 40 parts by weight, respectively, to obtain the pellets, and the test pieces were injection molded from these pellets. Evaluation results are shown in Table 1.

Example 3

The same procedure as defined in Example 1 was conducted except that the amounts of polyamide 6 resin X and aromatic polyamide A were changed to 30 parts by weight and 70 parts by weight, respectively, to obtain the pellets, and the test pieces were injection molded from these pellets. Evaluation results are shown in Table 1.

Comparative Example 1

The same procedure as defined in Example 1 was carried out except that the amount of polyamide 6 resin X was changed to 100 parts by weight, and that no aromatic polyamide A was used to obtain the pellets, and the test pieces were injection molded from these pellets. Evaluation results are shown in Table 1.

Comparative Example 2

The same procedure as defined in Example 1 was conducted except that the amounts of polyamide 6 resin X and aromatic polyamide A were changed to 10 parts by weight and 90 parts by weight, respectively, to obtain the pellets, and the test pieces were injection molded from these pellets. Evaluation results are shown in Table 1.

Comparative Example 3

The same procedure as defined in Example 1 was conducted except that no polyamide 6 resin X was used, and that the amount of aromatic polyamide A was changed to 100 parts by weight to obtain the pellets, and the test pieces were injection molded from these pellets. Evaluation results are shown in Table 1.

Example 4

The same procedure as defined in Example 1 was conducted except that the amount of glass fiber P was changed to 50 parts by weight to obtain the pellets, and the test pieces were injection molded from these pellets. Evaluation results are shown in Table 2.

Example5

The same procedure as defined in Example 1 was conducted except that the amount of glass fiber P was changed to 150 parts by weight to obtain the pellets, and the test pieces were injection molded from these pellets. Evaluation results are shown in Table 2.

Example 6

The same procedure as defined in Example 1 was conducted except that aromatic polyamide B was used in place of aromatic polyamide A to obtain the pellets, and the test pieces were injection molded from these pellets. Evaluation results are shown in Table 2.

TABLE 1

|  | Example | | | Comp. Example | | |
|---|---|---|---|---|---|---|
|  | 1 | 2 | 3 | 1 | 2 | 3 |
| Polyamide 6 resin X (parts by weight) | 75 | 60 | 30 | 100 | 10 | — |
| Aromatic polyamide A (parts by weight) | 25 | 40 | 70 | — | 90 | 100 |

TABLE 1-continued

|  | Example | | | Comp. Example | | |
|---|---|---|---|---|---|---|
|  | 1 | 2 | 3 | 1 | 2 | 3 |
| Glass fiber P (parts by weight) | 100 | 100 | 100 | 100 | 100 | 100 |
| Talc A (parts by weight) | 2 | 2 | 2 | 2 | 2 | 2 |
| Crystallinity (%) | 32 | 35 | 33 | 33 | 30 | 23 |
| Flexural modulus at 23° C. (GPa) | 15 | 16 | 16 | 12 | 16 | 17 |
| Flexural modulus at 80° C. (GPa) | 7.3 | 7.4 | 7.5 | 6.3 | 7.6 | 7.5 |
| Glossiness of molded article | 85 | 85 | 82 | 83 | 78 | 75 |

TABLE 2

|  | Example | | |
|---|---|---|---|
|  | 4 | 5 | 6 |
| Polyamide 6 resin X (parts by weight) | 75 | 75 | 75 |
| Aromatic polyamide A (parts by weight) | 25 | 25 | — |
| Aromatic polyamide B (parts by weight) | — | — | 25 |
| Glass fiber P (parts by weight) | 50 | 150 | 100 |
| Talc A (parts by weight) | 2 | 2 | 2 |
| Crystallinity (%) | 32 | 32 | 34 |
| Flexural modulus at 23° C. (GPa) | 13 | 17 | 16 |
| Flexural modulus at 80° C. (GPa) | 7.0 | 7.8 | 7.8 |
| Glossiness of molded article | 85 | 80 | 80 |

Examples 7–13 and Comparative Examples 4–12

The weighed quantities of the component materials shown in Tables 3 and 4 were mixed by a tumbler, melted and then kneaded at 270° C. by a vent type extruder, extruded into a string, cooled in a water bath, cut, dried and then pelletized. Evaluation results of the obtained products are shown in Tables 3 and 4. The accelerated deterioration test was carried out by Super UV test using a square mirror-surface plate as a test piece for 200 hours.

TABLE 3

| Example | 7 | 8 | 9 | 10 | 11 | 12 | 13 |
|---|---|---|---|---|---|---|---|
| Polyamide 6 resin Y (parts by weight) | 70 | 60 | 70 | 60 | 50 | 70 | 60 |
| Aromatic polyamide A (parts by weight) | 30 | 40 | 30 | 40 | 50 | 30 | 40 |
| Polyamide MXD 6 (parts by weight) | — | — | — | — | — | — | — |
| Polyamide 66 (parts by weight) | — | — | — | — | — | — | — |
| Talc A (parts by weight) | — | — | 1 | 1 | 1 | — | — |
| Glass fiber Q (parts by weight) | — | — | — | — | — | 25 | 25 |
| Moldability | ○ | ○ | ○ | ○ | ○ | ○ | ○ |

TABLE 3-continued

| Example | 7 | 8 | 9 | 10 | 11 | 12 | 13 |
|---|---|---|---|---|---|---|---|
| Glossiness (at 60°) | | | | | | | |
| Initial | 95.0 | 93.7 | 94.1 | 91.6 | 94.2 | 88.0 | 86.2 |
| After 200-hour irradiation | 84.2 | 81.5 | 83.7 | 79.5 | 76.4 | 73.1 | 71.9 |
| Color difference | 22.7 | 21.2 | 22.2 | 20.9 | 19.9 | 24.3 | 25.5 |
| Surface condition | ○ | ○ | ○ | ○ | ○ | ○ | ○ |

TABLE 4

| Comp. Example | 4 | 5 | 6 | 7 | 8 |
|---|---|---|---|---|---|
| Polyamide 6 Y (parts by weight) | 70 | 60 | 50 | 10 | 100 |
| Aromatic polyamide A (parts by weight) | — | — | — | 90 | — |
| Polyamide MXD 6 (parts by weight) | 30 | 40 | 50 | — | — |
| Polyamide 66 (parts by weight) | — | — | — | — | — |
| Talc A (parts by weight) | — | — | — | 1 | 1 |
| Copper iodide (parts by weight) | — | — | — | — | — |
| Potassium iodide (parts by weight) | — | — | — | — | — |
| Moldability | Δ | x | x | Δ | ○ |
| Glossiness (at 60°) | | | | | |
| Initial | 92.9 | 91.5 | 91.2 | 99.2 | 87.2 |
| After 200-hour irradiation | 78.8 | 75.5 | 73.2 | 45.3 | 42.1 |
| Color difference | 25.7 | 24.0 | 22.1 | 27.0 | 11.9 |
| Surface condition | ○ | ○ | ○ | Δ | x |

| Comp. Example | 9 | 10 | 11 | 12 |
|---|---|---|---|---|
| Polyamide 6 Y (parts by weight) | — | — | — | — |
| Aromatic polyamide A (parts by weight) | 100 | — | — | 100 |
| Polyamide MXD 6 (parts by weight) | — | 100 | — | — |
| Polyamide 66 (parts by weight) | — | — | 100 | — |
| Talc A (parts by weight) | 1 | 1 | 1 | 1 |
| Copper iodide (parts by weight) | — | — | — | 0.06 |
| Potassium iodide (parts by weight) | — | — | — | 0.15 |
| Moldability | Δ | x | ○ | Δ |
| Glossiness (at 60°) | | | | |
| Initial | 100 | 102 | 88.5 | 98.4 |
| After 200-hour irradiation | 19.7 | 27.3 | 15.8 | 57.4 |
| Color difference | 28.4 | 32.1 | 11.6 | 35.6 |
| Surface condition | x | x | x | Δ |

Examples 14–21 and Comparative Examples 13–16

The weighed quantities of the component materials shown in Tables 5 and 6 were mixed by a tumbler, melted and then kneaded at 270° C. by a vent type extruder, extruded into a string, cooled in a water bath, cut, dried and then pelletized. Evaluation results of the obtained products are shown in Tables 5 and 6. The accelerated deterioration test was carried out by Super UV test using a square mirror-surface plate as a test piece for 300 hours.

TABLE 5

| Example | 14 | 15 | 16 | 17 |
|---|---|---|---|---|
| Polyamide 6 Y (parts by weight) | 70 | 60 | 70 | 60 |
| Aromatic polyamide A (parts by weight) | 30 | 40 | 30 | 40 |
| Talc A (parts by weight) | 1 | 1 | 1 | 1 |
| Hindered amine A (parts by weight) | 0.67 | 0.67 | — | — |
| Hindered amine B (parts by weight) | — | — | 0.67 | 0.67 |
| Benzotriazoles (parts by weight) | — | — | — | — |
| Copper iodide (parts by weight) | — | — | — | — |
| Potassium iodide (parts by weight) | — | — | — | — |
| Moldability | ○ | ○ | ○ | ○ |
| Glossiness (at 60°) | | | | |
| Initial | 94.1 | 94.5 | 95.2 | 96.8 |
| After 200-hour irradiation | 60.1 | 54.2 | 58.2 | 52.8 |
| Color difference | 20.2 | 20.5 | 17.8 | 17.2 |
| Surface condition | ○ | ○ | ○ | ○ |

| Example | 18 | 19 | 20 | 21 |
|---|---|---|---|---|
| Polyamide 6 Y (parts by weight) | 70 | 60 | 60 | 60 |
| Aromatic polyamide A (parts by weight) | 30 | 40 | 40 | 40 |
| Talc A (parts by weight) | 1 | 1 | 1 | 1 |
| Hindered amine A (parts by weight) | — | — | 0.40 | — |
| Hindered amine B (parts by weight) | — | — | — | 0.40 |
| Benzotriazoles (parts by weight) | 0.67 | 0.67 | 0.27 | 0.27 |
| Copper iodide (parts by weight) | — | — | — | — |
| Potassium iodide (parts by weight) | — | — | — | — |
| Moldability | ○ | ○ | ○ | ○ |
| Glossiness (at 60°) | | | | |
| Initial | 94.2 | 96.2 | 95.8 | 94.4 |
| After 200-hour irradiation | 60.8 | 56.5 | 83.9 | 84.5 |
| Color difference | 15.0 | 15.8 | 9.8 | 11.7 |
| Surface condition | ○ | ○ | ⊙ | ⊙ |

TABLE 6

| Comparative Example | 13 | 14 | 15 | 16 |
|---|---|---|---|---|
| Polyamide 6 Y (parts by weight) | 10 | 100 | — | — |
| Aromatic polyamide A (parts by weight) | 90 | — | 100 | 100 |
| Talc A (parts by weight) | 1 | 1 | 1 | 1 |
| Hindered amine A (parts by weight) | — | — | — | — |
| Hindered amine B (parts by weight) | 0.67 | — | — | — |
| Benzotriazoles (parts by weight) | — | — | — | — |
| Copper iodide (parts by weight) | — | — | — | 0.06 |
| Potassium iodide (parts by weight) | — | — | — | 0.15 |
| Moldability | Δ | ○ | Δ | Δ |
| Glossiness (at 60°) | | | | |
| Initial | 99.2 | 87.2 | 100 | 98.4 |
| After 200-hour irradiation | 26.7 | 11.3 | 10.9 | 36.6 |
| Color difference | 28.5 | 12.6 | 31.4 | 35.6 |
| Surface condition | Δ | x | x | Δ |

Examples 22–23 and Comparative Examples 17–20

The weighed quantities of the component materials shown in Table 7 were mixed by a tumbler, melted and then kneaded at 270° C. by a vent type extruder, extruded into a string, cooled in a water bath, cut, dried and then pelletized. Evaluation results of the obtained products are shown in Table 7. The accelerated deterioration test was carried out by Super UV test using a square mirror-surface plate as a test piece for 200 hours.

TABLE 7

| | Example | | Comp. Example | | | |
|---|---|---|---|---|---|---|
| | 22 | 23 | 17 | 18 | 19 | 20 |
| Polyamide 6 Y (parts by weight) | 70 | 60 | 10 | 100 | — | — |
| Aromatic polyamide A (parts by weight) | 30 | 40 | 90 | — | 100 | 100 |
| Talc A (parts by weight) | 1 | 1 | 1 | 1 | 1 | 1 |
| Phenolic antioxidant (parts by weight) | 0.67 | 0.67 | 0.67 | — | — | — |
| Copper iodide (parts by weight) | — | — | — | — | — | 0.06 |
| Potassium iodide (parts by weight) | — | — | — | — | — | 0.15 |
| Moldability | ○ | ○ | Δ | ○ | Δ | Δ |
| Glossiness (at 60°) | | | | | | |
| Initial | 95.2 | 97.6 | 99.6 | 87.2 | 100 | 98.4 |
| After 200-hour irradiation | 87.4 | 89.0 | 58.5 | 42.1 | 19.7 | 57.4 |
| Color difference | 11.6 | 11.2 | 22.0 | 11.9 | 28.4 | 35.6 |
| Surface condition | ⊙ | ⊙ | Δ | x | x | Δ |

Examples 24–29 and Comparative Examples 21–22

The weighed quantities of the component materials shown in Table 8 were mixed by a tumbler, melted and then kneaded at 270° C. by a vent type extruder, extruded into a string, cooled in a water bath, cut, dried and then pelletized. Evaluation results of the obtained products are shown in Table 8.

In Examples 28 and 29, copper iodide alone was used as component (D). In this case, although gloss, surface condition and moldability were excellent, the molded article was tinted in reddish brown. The accelerated deterioration test was carried out by Super UV test using a square mirror-surface plate as a test piece for 300 hours.

TABLE 8

| Example | 24 | 25 | 26 | 27 |
|---|---|---|---|---|
| Polyamide 6 Y (parts by weight) | 40 | 40 | 40 | 40 |

TABLE 8-continued

| | | | | |
|---|---|---|---|---|
| Aromatic polyamide A (parts by weight) | 60 | 60 | 60 | 60 |
| Talc A (parts by weight) | 1 | 1 | 1 | 1 |
| Copper chloride (parts by weight) | 0.03 | 0.09 | — | — |
| Copper iodide (parts by weight) | — | — | 0.06 | 0.18 |
| Potassium iodide (parts by weight) | 0.20 | 0.60 | 0.15 | 0.45 |
| Moldability | ○ | ○ | ○ | ○ |
| Glossiness (at 60°) | | | | |
| Initial | 96.5 | 91.6 | 95.1 | 94.4 |
| After 300-hour irradiation | 36.6 | 42.0 | 54.6 | 57.7 |
| Surface condition | ○ | ○ | ◎ | ◎ |

| | Example | | Comp. Example | |
|---|---|---|---|---|
| | 28 | 29 | 21 | 22 |
| Polyamide 6 Y (parts by weight) | 40 | 40 | 100 | — |
| Aromatic polyamide A (parts by weight) | 60 | 60 | — | 100 |
| Talc A (parts by weight) | 1 | 1 | 1 | 1 |
| Copper chloride (parts by weight) | — | — | — | — |
| Copper iodide (parts by weight) | 0.06 | 0.18 | — | — |
| Potassium iodide (parts by weight) | — | — | — | — |
| Moldability | ○[1] | ○[1] | ○ | Δ |
| Glossiness (at 60°) | | | | |
| Initial | 94.2 | 93.8 | 87.2 | 100 |
| After 300-hour irradiation | 48.3 | 50.1 | 11.3 | 10.9 |
| Surface condition | ○ | ○ | x | x |

[1]The tint of the molded product was observed (reddish brown).

Examples 30–31 and Comparative Examples 23–24

The weighed quantities of the component materials shown in Table 9 were mixed by a tumbler, melted and then kneaded at 270° C. by a vented type extruder, extruded into a string, cooled in a water bath, cut, dried and then pelletized. Evaluation results of the obtained products are shown in Table 9. The accelerated deterioration test was carried out by metaling weather test using a square embossing texture plate as a test piece for 900 hours.

TABLE 9

| | Example | | Comp. Example | |
|---|---|---|---|---|
| | 30 | 31 | 23 | 24 |
| Polyamide 6 Y (parts by weight) | 40 | 60 | — | — |
| Aromatic polyamide A (parts by weight) | 60 | 40 | — | — |
| Polyamide MXD 6 (parts by weight) | — | — | 100 | 100 |
| Glass fiber Q (parts by weight) | 73 | 73 | 100 | 60 |
| Talc B (parts by weight) | 42 | 42 | 2 | 40 |
| Carbon black (parts by weight) | 6.67 | 6.67 | 6.67 | 6.67 |
| Copper iodide (parts by weight) | 0.18 | 0.18 | — | 0.18 |
| Potassium iodide (parts by weight) | 0.44 | 0.44 | — | 0.44 |

TABLE 9-continued

| | Example | | Comp. Example | |
|---|---|---|---|---|
| | 30 | 31 | 23 | 24 |
| (parts by weight) | | | | |
| Moldability | ○ | ○ | x | x |
| Glossiness (at 60°) | | | | |
| Initial | 12.0 | 11.8 | 10.0 | 11.0 |
| After 900-hour irradiation | 4.7 | 4.5 | 0.8 | 1.0 |
| Color difference | 3.3 | 3.5 | 4.9 | 4.2 |
| Surface condition | ○ | ○ | x | Δ |

Example 32 and Comparative Example 25

The weighed quantities of the component materials shown in Table 10 were mixed by a tumbler, melted and then kneaded at 270° C. by a vent type extruder, extruded into a string, cooled in a water bath, cut, dried and then pelletized. Evaluation results of the obtained products are shown in Table 10. The accelerated deterioration test was carried out by sunshine fade test using a square mirror-surface plate as a test piece for 400 hours.

TABLE 10

| | Example 32 | Comp. Example 25 |
|---|---|---|
| Polyamide 6-Y (parts by weight) | 40 | — |
| Aromatic polyamide A (parts by weight) | 60 | — |
| Polyamide MXD 6 (parts by weight) | — | 100 |
| Glass fiber Q (parts by weight) | 100 | 100 |
| Talc B (parts by weight) | 2 | 2 |
| Hindered amine B (parts by weight) | 0.52 | — |
| Benzotriazoles (parts by weight) | 0.40 | — |
| Phenolic antioxidant (parts by weight) | 0.40 | — |
| Moldability | ○ | x |
| Glossiness (at 60°) | | |
| Initial | 85.0 | 75.0 |
| After 400-hour irradiation | 84.0 | 71.0 |
| Color difference | 3.0 | 13.5 |
| Surface condition | ◎ | Δ |

What is claimed is:

1. A polyamide resin composition consisting essentially of:
   100 parts by weight of a polyamide resin mixture comprising
   (A) 20 to 90% by weight of a polyamide 6 resin, a polyamide 66 resin or mixture thereof and
   (B) 10 to 80% by weight of an aromatic polyamide resin; and
   (C) 0 to 300 parts by weight of an inorganic filler,
   said aromatic polyamide resin having diamine units comprising 10 to 50 mol % of paraxylylenediamine units and 50 to 90 mol % of methaxylylenediamine units, and aliphatic dicarboxylic acid units.

2. The polyamide resin composition according to claim 1, wherein the amount of the inorganic filler (C) blended is 45 to 150 parts by weight based on 100 parts by weight of the polyamide resins (A) and (B).

3. The polyamide resin composition according to claim 1, wherein the amount of the inorganic filler (C) blended is less than 45 parts by weight based on 100 parts by weight of the polyamide resins (A) and (B).

4. The polyamide resin composition according to claim 1, further comprising (D) 0.05 to 5 parts by weight of a light stabilizer based on 100 parts by weight of the polyamide (A) and (B).

5. The polyamide resin composition according to claim 1, further comprising (E) 0.05 to 5 parts by weight of a phenolic antioxidant based on 100 parts by weight of the polyamide (A) and (B).

6. The polyamide resin composition according to claim 1, further comprising (F) 0.05 to 5 parts by weight of a copper compound, a halide or mixture thereof based on 100 parts by weight of the polyamide (A) and (B).

7. The polyamide resin composition according to claim 6, wherein the mixture of 0.01 to 2 parts by weight of a copper compound (F') and 0.05 to 3 parts by weight of an alkali metal halide (F") based on 100 parts by weight of the polyamide resins (A) and (B) is used.

8. The polyamide resin composition according to claim 1, wherein relative viscosity of (A) the polyamide 6 resin, polyamide 66 resin or mixture thereof is 1.8 to 3.5.

9. The polyamide resin composition according to claim 1, wherein the diamine units comprises 20 to 45 mol % of paraxylylene diamine units and 55 to 80 mol % of methaxylylenediamine units.

10. The polyamide resin composition according to claim 1, wherein the aliphatic dicarboxylic acid is an α,ω-straight-chain aliphatic dicarboxylic acid.

11. The polyamide resin composition according to claim 1, wherein the aliphatic dicarboxylic acid is an aliphatic dicarboxylic acid having 6 to 12 carbon atoms.

12. The polyamide resin composition according to claim 1, wherein relative viscosity of the aromatic polyamide resin is 1.6 to 3.0.

13. The polyamide resin composition according to claim 1, wherein the inorganic filler is a fibrous filler having an average fiber diameter of not more than 14 μm or a powdery, granular or flaky filler having an average particle diameter of not more than 50 μm.

14. The polyamide resin composition according to claim 1, wherein the inorganic filler (C) is selected from the group consisting of glass fiber, talc and mica.

15. The polyamide resin composition according to claim 4, wherein the light stabilizer (D) is selected from the group consisting of hindered amines and benzotriazoles.

16. The polyamide resin composition according to claim 1, wherein the whole of the component (A) is a polyamide 6 resin.

17. A molded article for outdoor use, obtained by molding a polyamide resin composition as defined in claim 1.

18. The molded article according to claim 17, obtained by a polyamide resin composition in which melt viscosity of (A) the polyamide 6 resin, polyamide 66 resin or mixture thereof is lower than that of the aromatic polyamide resin (B).

19. The molded article according to claim 17, obtained by molding a polyamide resin composition in which melt viscosity of (A) the polyamide 6 resin, polyamide 66 resin or mixture thereof is higher than that of the aromatic polyamide resin (B).

20. The polyamide resin composition according to claim 1, wherein a molded article obtained from molding the polyamide resin composition at between 70° C. and 90° C. by a #3000 mirror-polished mold has a glossiness of the surface of not less than 80%.

21. A polyamide resin composition consisting essentially of:
   100 parts by weight of a polyamide resin mixture comprising
      (A) 20 to 90% by weight of a polyamide 6 resin, a polyamide 66 resin or mixture thereof and
      (B) 10 to 80% by weight of an aromatic polyamide resin; and
      (C) 0 to 300 parts by weight of an inorganic filler,
   said aromatic resin mainly comprising polyamide obtained from polycondensation reaction of a diamine mixture comprising 10 to 50 mol % of paraxylylenediamine and 50 to 90 mol % of methaxylylenediamine, and an aliphatic dicarboxylic acid.

22. A polyamide resin composition consisting essentially of:
   100 parts by weight of a polyamide resin mixture comprising
      (A) 20 to 90% by weight of a polyamide 6 resin, a polyamide 66 resin or mixture thereof and
      (B) 10 to 80% by weight of an aromatic polyamide resin, said aromatic polyamide resin having diamine units comprising 10 to 50 mol % of paraxylylenediamine units and 50 to 90 mol % of methaxylylenediamine units, and aliphatic dicarboxylic acid units;
      (C) 0 to 300 parts by weight of an inorganic filler; and
   one or more additives selected from the group consisting of antistatic agent, coloring material, release agent, lubricant, plasticizer, nucleating agent, and stabilizers.

23. A molded article produced by injection molding, which comprises a polyamide resin composition consisting essentially of:
   100 parts by weight of a polyamide resin mixture comprising
      (A) 20 to 90% by weight of a polyamide 6 resin, a polyamide 66 resin or mixture thereof and
      (B) 10 to 80% by weight of an aromatic polyamide resin; and
      (C) 0 to 300 parts by weight of an inorganic filler,
   said aromatic polyamide resin having diamine units comprising 10 to 50 mol % of paraxylylenediamine units and 50 to 90 mol % of methaxylylenediamine units, and aliphatic dicarboxylic acid units.

24. A molded article according to claim 23, wherein the injection molding is conducted by use of a mirror-polished mold.

25. A molded article according to claim 23, wherein the flexural modulus of elasticity is not less than 10 GPa at room temperature (23° C.) and not less than 7 GPa at 80° C.

* * * * *